INVENTOR.
RENÉ DÄNDLIKER

United States Patent Office 3,717,404
Patented Feb. 20, 1973

3,717,404
APPARATUS FOR DETERMINING THE POSITION OF AN OBJECT IN AN ARBITRARY CROSS-SECTION OF A BEAM OF RADIATION
Rene Dandliker, Zug, Switzerland, assignor to U.S. Philips Corporation, New York, N.Y.
Filed July 6, 1971, Ser. No. 159,716
Claims priority, application Netherlands, July 9, 1970, 7010130
Int. Cl. G01b 9/02; G01j 3/46
U.S. Cl. 356—106                          9 Claims

ABSTRACT OF THE DISCLOSURE

An apparatus for determining the position of an object in an arbitrary cross-section of a beam of electromagnetic radiation is described.

Figure 1:
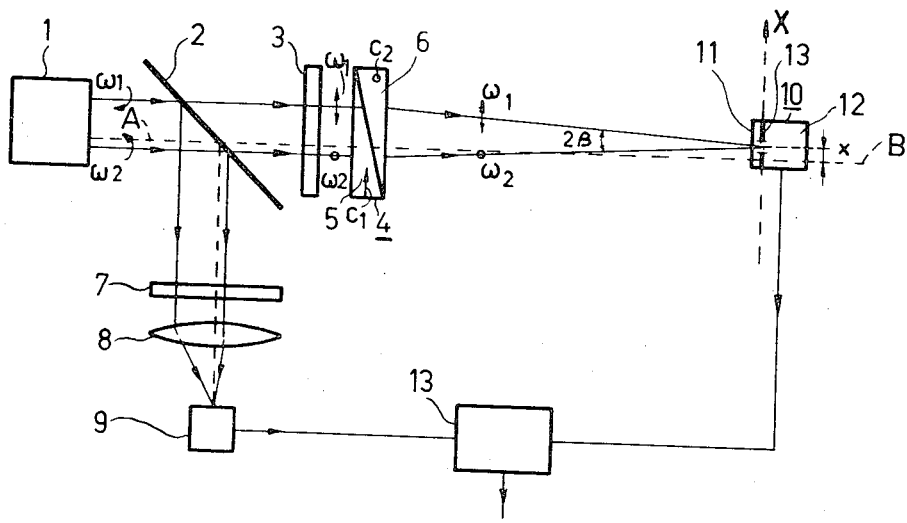

It is set forth that for this purpose the radiation beam is produced by two monochromatic coherent orthogonally polarized radiation sources having different frequencies, the frequency difference being small compared with each of the frequencies, whilst the radiation beam is divided in a polarization-sensitive system into at least two sub-beams which each have one of the said different frequencies and are applied to the detection system rigidly secured to the object.

---

The invention relates to an apparatus for determining the position of an object in an arbitrary cross-section of a beam of electromagnetic radiation. In a known apparatus of the said type described in Applied Optics, 7, pages 2315–2317, the interference of light beams is utilized. The beam of light which enters a Kösters prism through a first lateral face is split by the beam splitter in the prism into two components which both emerge from the prism through the second lateral face. The sub-beams are reflected at two faces of a Porro prism, re-enter the second lateral face of the Kösters prism, unite in the prism and emerge from it through the third lateral face. When emerging the sub-beams have an optical path difference which is proportional to the angle of incidence of the beam on the first lateral face and to the distance between the axis of the symmetry of the Porro prism and the plane of the beam-splitter in the Köster prism. This distance, and hence the position in the beam, may be exactly determined from the path difference.

The known apparatus has several fundamental disadvantages. First, measurement of the phase in the interference pattern is possible only if the dimensions of the detection system at right angles to the direction of the emergent beam are of the same order of magnitude as is the period of the interference pattern.

Secondly, in order to determine the phase it is necessary to compare intensity signals with one another. Especially in the case of large distances from the source of radiation these signals are subject to fluctuations due to inhomogeneities of the medium traversed. These fluctuations impede the determination of the phase.

In co-pending Netherlands patent application No. 6918301 corresponding to U.S. application Ser. No. 93,341, filed Nov. 27, 1970, an apparatus is proposed which does not have the disadvantages inherent in the known apparatus.

It is an object of the present invention to avoid the disadvantages of the known apparatus in a different manner. For this purpose the apparatus according to the invention is characterized in that the beam of radiation is produced by two monochromatic coherent orthogonally polarized radiation sources having different frequencies, the frequency difference being small compared with either of the frequencies, which beam of radiation is divided in a polarization-sensitive system into at least two sub-beams which each have one of the said different frequencies and are applied to the detection system rigidly secured to the object.

The invention is based on the recognition that the superposition of two beams having slightly different frequencies results in an interference pattern which moves at a speed proportional to the difference frequency in a direction at right angles to the direction of the beams. The interference pattern produces in a stationary radiation detector a modulated signal the phase of which is a measure of the position of the detector within a single period of the interference pattern. Irrespective of the amplitude of the signal, comparison with a reference signal at the difference frequency, which signal has a constant phase, accurately determines the position of the detector within a single period of the interference pattern.

Figure 2:
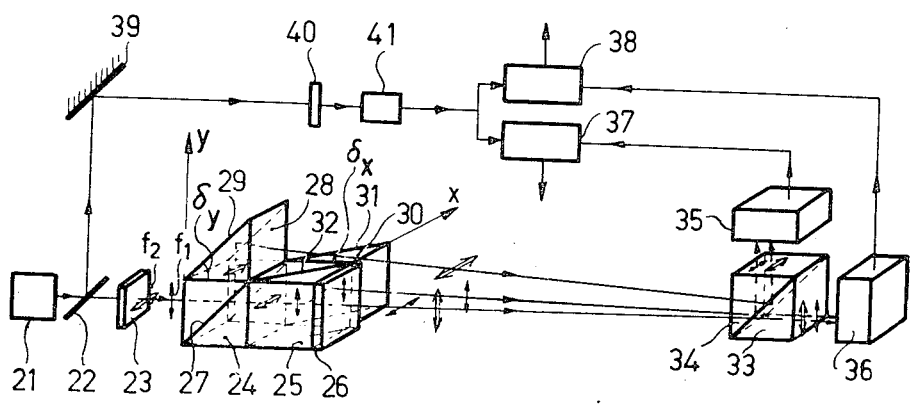

Embodiments of the invention will now be described, by way of example, with reference to the accompanying diagrammatic drawings, in which FIG. 1 shows a first embodiment of an apparatus according to the invention, and FIG. 2 shows a second embodiment thereof.

Referring now to FIG. 1, reference numeral 1 denotes a laser which in know manner is designed so as to oscillate in only one longitudinal mode. A magnetic coil is wound around the laser 1. The coil current generates a magnetic field which causes the laser oscillation to be divided into two oppositely circularly polarized oscillations of mutually different frequencies $f_1$ and $f_2$. The frequency difference $f_1-f_2$ is very small compared with the laser frequencies $f_1$ and $f_2$.

The collimated laser beam impinges on an isotropic beam-splitting mirror 2. The part of the laser beam which is reflected at the mirror 2 falls on a linear polarizer 7. The plane-polarized beam which emerges from the polarizer is applied through a lens 8 to a radiation detector 9 which is arranged substantially in the focal plane of the lens 8. The beam incident on the linear polarizer 7 comprises two oppositely circularly polarized components having slightly different frequencies $f_1$ and $f_2$. The superposition of the two such components corresponds to a plane-polarized beam the direction of polarization of which rotates at one half of the diference frequency $\frac{1}{2}(f_1-f_2)$.

Consequently, the electric signal generated in the radiation detector 9 may be represented by $$I_1 = a \cos 2\pi(f_1-f_2)t$$

The part of the laser beam transmitted by the mirror 2 passes through a $\lambda/4$ plate 3 and then falls on a Wollaston prism 4. In the $\lambda/4$ plate 3 two oppositely circularly polarized components are each converted into a plane-polarized sub-beam, the directions of polarization of the two sub-beams being at right angles to one another. The direction of polarization of the sub-beam at the frequency $f_1$ is assumed to be parallel to the plane of the drawing, and that of the sub-beam at the frequency $f_2$ is assumed to be at right angles to the plane of the drawing. This is obtainable by a suitable choice of the principal directions of the $\lambda/4$ plate 3.

The Wollaston prism comprises two congruent prisms 5 and 6 made of uni-axial birefringent crystals which are combined to form the plane-parallel plate 4. The optic axis $c_1$ of the crystal 5 is parallel to the plane of the drawing, and the optic axis $c_2$ of the crystal 6 is at right angles to the plane of the drawing. In the Wollaston prism the sub-beams incident at right angles to one of the parallel major faces are deviated so that the beams which emerge from the prism are inclined at an angle of $2\beta$ to one another.

The emergent beams are intercepted by a detection system 10 which is spaced by a distance $x$ from the axis AB of the optical system which intersects the Wollaston prism at the point at which the component prisms 5 and 6 have the same thickness. The detection system 10 comprises a linear polarizer 11 the plane of polarization of which is inclined at angles of 45° to the direction of polarization of the two sub-beams and which is followed by a radiation detector 12 arranged behind a narrow slit in a partition 13.

The amplitude of the interfering sub-beams which occurs in the slit may be represented by:

$$A_2 = b \cos\left\{2\pi \frac{f_1-f_2}{2} t + \pi \frac{\Delta 1}{\lambda}\right\}$$

where $\Delta 1$ is the path difference between the orthogonally polarized beams and $\lambda$ is the mean wavelength of the radiation. The path difference $\Delta 1$ is proportional to $x$, i.e. the distance of the slit from the axis AB, according to the relation:

$$\Delta 1 = \lambda \frac{x}{x_0}$$

Physically this relation means that in a plane at right angles to the axis of the optical system parallel lines of maxima and minima in the intensity occur. The distance $x_0$ between two successive maxima is (for small angles $\beta$): $x_0 = \lambda/2\beta$, and the velocity at which the lines move owing to the different frequencies of the interfering beams is: $(f_1-f_2)x_0$.

In the radiation detector 12, there is produced a modulation signal $I_2$ which is proportional to:

$$b \cos\left\{2\pi(f_1-f_2)t + 2\pi \frac{\Delta 1}{\lambda}\right\} = b \cos\left\{2\pi(f_1-f_2)t + 2\pi \frac{x}{x_0}\right\}$$

In the electronic phase meter 14 this signal is compared with the reference signal $$I_1 = a \cos 2\pi(f_1-f_2)t$$

Irrespective of the values of $a$ and $b$, the phase angle $$\varphi = 2\pi \frac{x}{x_0}$$

may be determined to a fraction of one degree and hence the distance of the detector 10 (more exactly: of the slit in the partition 13) from the axis of the optical system may be determined apart from a multiple of $x_0$. The multiple of $x_0$ may in known manner be measured by means of an electronic counter.

As the polarisation-sensitive system use may be made, instead of the Wollaston prism 4, of a Savart plate or one of the polarization-sensitive systems described in co-pending Netherlands patent application No. 6918301 corresponding to U.S. application Ser. No. 93,341, filed Nov. 27, 1970. When a Savart plate is used, however, the distance between the lines of maxima and minima in the intensity are not constant.

If the position of an object is to be determined in two directions at right angles to one another, the apparatus shown in FIG. 1 may be doubled, i.e. the beam of radiation may also be caused to fall through a Wollaston prism, which has been rotated about the axis AB through an angle of 90° relative to the prism 4, on a detection system in which the slit in front of the radiation detector extends at right angles to that used in the system 10.

The information about the position in the two mutually perpendicular directions may be separated in a variety of manners, for example by using two sources of light of different mean optical wavelengths or by using, with the same mean optical wavelength, two different difference frequencies.

A more elegant separation of the information about the position of an object in two mutually perpendicular directions in a cross-section of a radiation beam, however, is effected in the apparatus shown in FIG. 2. In this apparatus the separation is effected by using interference patterns polarized at right angles to one another. These interference patterns are generated by means of a single light source which emits two orthogonally polarized beams having different frequencies.

In FIG. 2 the laser source 21 is identical to the laser source 1 of FIG. 1. Thus, two oppositely circularly polarized radiation beams at frequencies $f_1$ and $f_2$ with a slight frequency difference $f_1-f_2$ are emitted by the source 21. The part of the radiation beams transmitted by an isotropic beam-splitting mirror 22 passes through a $\lambda/4$ plate 23. From the $\lambda/4$ plate 23 there emerge plane-polarized sub-beams at frequencies $f_1$ and $f_2$ the directions of polarization of which are at right angles to one another. These sub-beams fall on a prism system comprising polarization-sensitive beam-splitting prisms 24 and 25, reflecting prisms 28 and 30, and a $\lambda/2$ plate 26.

The direction of polarization of the sub-beam at the frequency $f_2$ is at right angles to the plane of incidence of the sub-beams on the interface 27 of the beam-splitting prism 24 and lies in the plane of incidence of the sub-beams on the interface 32 of the beam-splitting prism 25. The direction of polarization of the sub-beam at the frequency $f_1$ lies in the plane of incidence of the sub-beams on the interface 27 of the beam-splitting prism 24 and is at right angles to the plane of incidence of the sub-beams on the interface 32 of the beam-splitting prism 25.

The interface 27 is such that radiation having a direction of polarization in the plane of incidence is entirely transmitted, whilst of the radiation having a direction of polarzation at right angles to the plane of incidence one half is reflected and the other half is transmitted. Thus, of the sub-beam at the frequency $f_2$ one half is reflected and the other half is transmitted, whilst the sub-beam at the frequency $f_1$ is entirely transmitted.

The interface 32 of the beam-splitting prism 25 also is such that radiation having a direction of polarization lying in the plane of incidence is entirely transmitted, whilst of radiation having a direction of polarization at right angles to the plane of incidence one half is reflected and the other half is transmitted. Consequently, of the sub-beam at the frequency $f_1$, which is entirely transmitted by the interface 27 of the beam-splitting prism 24, one half is reflected at the interface 32 and the other half is transmitted by this interface, whilst the half of the sub-beam at the frequency $f_2$ which has been transmitted by the interface 27 is entirely transmitted by the interface 32 of the beam-splitting prism 25.

The half of the sub-beam at the frequency $f_2$ which has been reflected at the interface 27 is entirely reflected at the totally reflecting face 29 of the reflecting prism 28, and the half of the sub-beam at the frequency $f_1$ which has been reflected at the interface 32 is entirely reflected at the totally reflecting face 31 of the reflecting prism 30.

The face 29 is at an angle $\delta_y$ to a plane $V_1$ formed by the direction of propagation of the radiation beams incident on the prism system and by the direction of polarization of the sub-beam at the frequency $f_2$. The face 31 is at an angle $\delta_x$ to a plane $V_2$ formed by the direction of propagation of the beams of radiation incident on the prism system and by the direction of polarization of the sub-beam at the frequency $f_1$. The planes $V_1$ and $V_2$ are at right angles to one another.

The sub-beam transmitted by the interface 32 comprises two components: one at the frequency $f_1$ and one at the frequency $f_2$. Each component has an intensity equal to one half of that of the beam at the same frequency incident on the system. The two components pass through a $\lambda/2$ plate 26 which rotates the plane of polarization of each component through 90%. Hence, the component at the frequency $f_1$ which emerges from the plate 26 has a direction of polarization equal to that of the sub-beam at the frequency $f_2$ reflected at the face 29; the component at the frequency $f_2$ which emerges from the plate 26 has a direction of polarization equal to that of the sub-beam at the frequency $f_1$ which is reflected at the face 31. The direction of the components which emerge from the $\lambda/2$ plate 26 is the same as that of the radiation beam incident on the system.

The angle between the sub-beam at the frequency $f_2$ which is reflected at the face 29 and the component at the frequency $f_1$ which emerges from the plate 26 is $90°-2\delta_y$; the angle between the sub-beam at the frequency $f_1$ which is reflected at the face 31 and the component at the frequency $f_2$ which emerges from the plate 26 is $90°-2\delta_x$. The angles $90°-2\delta_y$ and $90°-2\delta_x$ lie in two planes at right angles to one another.

In a polarization-separating prism 33 the beams which are at the angle of $90°-2\delta_y$ to one another are totally reflected at a polarization-sensitive interface 34 towards a detection system 35; the beams which are at the angle of $90°-2\delta_x$ to one another are entirely transmitted by the polarization-sensitive interface 34 towards a detection system 36.

These two detection systems are analogous to the detection system 10 of the apparatus shown in FIG. 1.

In the plane of each detector parallel lines of maxima and minima in the intensity are produced which are spaced from one another by distances $$X_0 = \frac{\lambda}{2 \sin \frac{1}{2}(90°-2\delta_x)}$$

and $$y_0 = \frac{\lambda}{2 \sin \frac{1}{2}(90°-2\delta_y)}$$

respectively.

The velocity at which the lines move is $(f_1-f_2)x_0$ and $(f_1-f_2)y_0$, respectively.

The signals produced in the detectors may be written:

$$A \cos \left\{ 2\pi(f_1-f_2)t + 2\pi \left(\frac{x}{x_0}\right) \right\}$$

and $$B \cos \left\{ 2\pi(f_1-f_2)t + 2\pi \left(\frac{y}{y_0}\right) \right\}$$

respectively.

In a phase meter 37 and 38 respectively these signals are compared with the phase of the reference signal $\cos 2\pi(f_1-f_2)t$ which results from the sub-beam which is separated by the isotropic beam-splitting mirror 22 from the beam emitted by the source 21 and which is applied, via a mirror 39 and a plane polarizer 40, to a detector 41.

In order to increase the values of the electric signals produced in the detectors, the faces of the polarization-separating prism 33 which are disposed toward and closer to the detection systems 35 and 36 may be replaced by grating systems of period $y_0$ and $x_0$ respectively.

What is claimed is:

1. Apparatus for determining the position of an object in an arbitrary cross-section of a beam of electro-magnetic radiation, comprising means for providing two spatially separated coherent monochromatic orthogonally polarized radiation beams having different frequencies, the frequency difference being a fraction of either of the two frequencies, a polarization-sensitive system for angularly deflecting both beams toward a common intersection, and a radiation-sensitive detector attached to the object and located in the vicinity of the intersection.

2. Apparatus as claimed in claim 1, wherein the means for providing the two beams of orthogonally polarized radiation comprises a single radiation source emitting two oppositely circularly polarized oscillations of mutually different frequencies and a $\lambda/4$ plate in the path of both beams.

3. Apparatus as claimed in claim 1, wherein the polarization-sensitive system comprises a Wollaston prism.

4. Apparatus as claimed in claim 1, further comprising means for providing a reference signal having a frequency equal to the frequency difference between the two monochromatic beams and having a constant phase, and means for comparing the signals from the radiation-sensitive detector with the reference source.

5. Apparatus as claimed in claim 4, wherein the means for providing a reference signal comprises a beam splitter in the path of both beams of radiation from the radiation source for producing two sub-beams, a second radiation-sensitive detector, and means for directing the two sub-beams to the second radiation-sensitive detector.

6. Apparatus as claimed in claim 1, wherein the means for angularly deflecting the two coherent monochromatic beams of different frequencies comprises a first polarization-sensitive beam splitting means in the path of a first of the two frequencies of radiation for dividing the radiation of the first frequency into a first pair of spatially separated sub-beams, a first reflecting surface in the path of one sub-beam of the first pair for angularly deflecting the sub-beam toward an intersection with the other sub-beam of the first pair of sub-beams, a second polarization-sensitive beam splitting means in the path of a second of the two frequencies of radiation for dividing the radiation of the second frequency into a second pair of sub-beams spatially separated in a direction orthogonal to the direction of separation of the first sub-beams, a second reflecting surface in the path of one sub-beam of the second pair of sub-beams for deflecting the impinging sub-beam toward an intersection of the other sub-beam of the second pair, and a $$(2n+1)\frac{\lambda}{2}$$

plate in the path of one sub-beam of each pair of sub-beams ($n=0, 1, 2, 3, \ldots$) for rotating the plane of polarization of the impinging sub-beams by a multiple of $90°$.

7. Apparatus as claimed in claim 6, wherein the polarization-sensitive prisms each have interfaces for both transmitting and reflecting one-half of the impinging radiation having a plane of polarization at right angles to the plane of incidence on the respective interface.

8. Apparatus as claimed in claim 6, wherein the radiation-sensitive detection system comprises two photo-detectors, and a polarization-separating beam splitting prism in the path of both pairs of sub-beams for directing one sub-beam from each pair of sub-beams to one photo-detector and for directing the other sub-beams of the two pairs of sub-beams to the other photo-detector.

9. Apparatus as claimed in claim 8, further comprising a grating system consisting of alternate radiation-permeable and radiation-impermeable lines on each of the lateral faces of the polarization-separating beam-splitting prism.

References Cited

UNITED STATES PATENTS 3,399,591  9/1968  Drougard et al. ...... 356—106 X
3,463,924  8/1969  Culshaw et al. ...... 356—106 X RONALD L. WIBERT, Primary Examiner C. CLARK, Assistant Examiner U.S. Cl. X.R.
356—172